United States Patent
Barwicz et al.

(10) Patent No.: US 11,860,414 B2
(45) Date of Patent: Jan. 2, 2024

(54) EDGE COUPLERS INCLUDING A GROOVED MEMBRANE

(71) Applicant: GLOBALFOUNDRIES U.S. Inc., Santa Clara, CA (US)

(72) Inventors: Tymon Barwicz, Holmdel, NJ (US); Robert K. Leidy, Burlington, VT (US); Thomas Houghton, Marlboro, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 312 days.

(21) Appl. No.: 17/137,549

(22) Filed: Dec. 30, 2020

(65) Prior Publication Data

US 2022/0206220 A1    Jun. 30, 2022

(51) Int. Cl.
*G02B 6/26* (2006.01)
*G02B 6/42* (2006.01)
*G02B 6/10* (2006.01)
*G02B 6/122* (2006.01)
*G02B 6/13* (2006.01)

(52) U.S. Cl.
CPC .............. *G02B 6/1228* (2013.01); *G02B 6/13* (2013.01)

(58) Field of Classification Search
CPC ........ G02B 6/1228; G02B 6/13; G02B 6/136; G02B 6/305; G02B 6/12; G02B 6/4296; G02B 2006/12061; G02B 2006/121; G02B 2006/12147; G02B 2006/12176
USPC ......... 385/1, 11, 14, 28, 40, 43, 45, 50, 124, 385/129–132
See application file for complete search history.

(56) References Cited

U.S. PATENT DOCUMENTS

| | | | |
|---|---|---|---|
| 7,738,753 B2 | 6/2010 | Assefa et al. | |
| 8,534,927 B1 | 9/2013 | Barwicz et al. | |
| 9,507,064 B2 | 11/2016 | Brongersma et al. | |
| 9,568,682 B1 | 2/2017 | Barwicz et al. | |
| 9,817,164 B2 | 11/2017 | Murakowski et al. | |

(Continued)

FOREIGN PATENT DOCUMENTS

| | | |
|---|---|---|
| CN | 107111064 A | 8/2017 |
| CN | 109690374 A | 4/2019 |

(Continued)

OTHER PUBLICATIONS

Anatol Khilo, Miloš A. Popović, Mohammad Araghchini, and Franz X. Kärtner, "Efficient planar fiber-to-chip coupler based on two-stage adiabatic evolution," Opt. Express 18, 15790-15806 (2010).

(Continued)

*Primary Examiner* — Kaveh C Kianni
*Assistant Examiner* — Hung Q Lam
(74) *Attorney, Agent, or Firm* — Thompson Hine LLP; Anthony Canale (57) ABSTRACT

Structures including an edge coupler and methods of fabricating a structure including an edge coupler. The structure includes a waveguide core region on a first dielectric layer, and a second dielectric layer on the waveguide core region and the first dielectric layer. The waveguide core region has a tapered section with an end surface that terminates adjacent to an edge of the first dielectric layer. The second dielectric layer includes a first trench and a second trench that are each positioned adjacent to the tapered section of the waveguide core region.

19 Claims, 7 Drawing Sheets

(56) References Cited

U.S. PATENT DOCUMENTS

| | | | |
|---|---|---|---|
| 10,107,960 B2 | 10/2018 | Hickey et al. | |
| 10,133,094 B1* | 11/2018 | Yu | H10K 39/00 |
| 10,295,750 B2 | 5/2019 | Chen | |
| 11,156,772 B2 | 10/2021 | Yu et al. | |
| 2017/0299793 A1 | 10/2017 | Fattal | |
| 2019/0086597 A1 | 3/2019 | Kawakami et al. | |
| 2019/0243070 A1* | 8/2019 | Drake | G02B 6/12 |
| 2021/0271119 A1* | 9/2021 | Yu | G02B 6/12 |

FOREIGN PATENT DOCUMENTS

| | | |
|---|---|---|
| CN | 110648974 A | 1/2020 |
| CN | 111562650 A | 8/2020 |
| WO | 2019219703 A1 | 11/2019 |

OTHER PUBLICATIONS

B. Ben Bakir et al., "Low-Loss (< 1 dB) and Polarization-Insensitive Edge Fiber Couplers Fabricated on 200-mm Silicon-on-Insulator Wafers," in IEEE Photonics Technology Letters, vol. 22, No. 11, pp. 739-741, Jun. 1, 2010.

L. Chen, C. R. Doerr, Y. Chen and T. Liow, "Low-Loss and Broadband Cantilever Couplers Between Standard Cleaved Fibers and High-Index-Contrast Si 3N 4 or Si Waveguides," in IEEE Photonics Technology Letters, vol. 22, No. 23, pp. 1744-1746, Dec. 1, 2010.

Pavel Cheben, Przemek J. Bock, Jens H. Schmid, Jean Lapointe, Siegfried Janz, Dan-Xia Xu, Adam Densmore, André Delâge, Boris Lamontagne, and Trevor J. Hall, "Refractive index engineering with subwavelength gratings for efficient microphotonic couplers and planar waveguide multiplexers," Opt. Lett. 35, 2526-2528 (2010).

T. Barwicz, A. Janta-Polczynski, M. Khater, Y. Thibodeau, R. Leidy, J. Maling, S. Martel, S. Engelmann, J. S. Orcutt, P. Fortier, and W. M. J. Green, "An O-band Metamaterial Converter Interfacing Standard Optical Fibers to Silicon Nanophotonic Waveguides," in Optical Fiber Communication Conference, OSA Technical Digest (online) (Optical Society of America, 2015), paper Th3F.3.

T. Barwicz et al., "A metamaterial converter centered at 1490nm for interfacing standard fibers to nanophotonic waveguides," 2016 Optical Fiber Communications Conference and Exhibition (OFC), Anaheim, CA, 2016, pp. 1-3.

N. B. Feilchenfeld et al., "Silicon photonics and challenges for fabrication", Proceedings vol. 10149, Advanced Etch Technology for Nanopatterning VI; 101490D (2017), SPIE Advanced Lithography, 2017, San Jose, California, United States.

Tymon Barwicz, et al., "Automated, high-throughput photonic packaging", Optical Fiber Technology, vol. 44, 2018, pp. 24-35.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019.

Mu, X.; Wu, S.; Cheng, L.; Fu, H.Y. Edge Couplers in Silicon Photonic Integrated Circuits: A Review. Appl. Sci. 2020, 10, 1538.

China National Intellectual Property Administration, First Office Action and Search Report issued in Chinese Patent Application No. 202111269188.6 dated Jul. 6, 2023; 7 pages.

* cited by examiner

EDGE COUPLERS INCLUDING A GROOVED MEMBRANE

BACKGROUND

The present invention relates to photonics chips and, more specifically, to structures including an edge coupler and methods of fabricating a structure including an edge coupler.

Photonics chips are used in many applications and systems including data communication systems and data computation systems. A photonics chip integrates optical components, such as waveguides, optical switches, edge couplers, and polarizers, and electronic components, such as field-effect transistors, into a unified platform. Among other factors, layout area, cost, and operational overhead may be reduced by the integration of both types of components.

An edge coupler is commonly used for coupling laser light between an optical fiber and optical components on the photonics chip. The edge coupler may include a tapered section of a waveguide core at the edge of the photonics chip. The edge coupler has a significantly smaller mode size than the beam of laser light emitted by the optical fiber. Inefficiencies in the optical coupling between the optical fiber and the edge coupler may occur due to the mismatched mode size, as well as differences in mode shape. Uncertainties in the fabrication of an edge coupler, such as uncertainties in the refractive indices of the materials, can create offsets in the desired mode shape and mode size. In addition, manufacturing imperfections causing packaging errors may result in misalignment between the optical fiber and edge coupler. These inefficiencies, and others, may give rise to a significant coupling loss.

Improved structures including an edge coupler and methods of fabricating a structure including an edge coupler are needed.

SUMMARY

In an embodiment of the invention, a structure for an edge coupler is provided. The structure includes a first dielectric layer having an edge, a waveguide core region on the first dielectric layer, and a second dielectric layer on the waveguide core region and the first dielectric layer. The waveguide core region has a tapered section with an end surface that terminates adjacent to the edge of the first dielectric layer. The second dielectric layer includes a first trench and a second trench that are each positioned adjacent to the tapered section of the waveguide core region.

In an embodiment of the invention, a method of forming a structure for an edge coupler is provided. The method includes forming a waveguide core region on a first dielectric layer. The waveguide core region has a tapered section with an end surface that terminates adjacent to an edge of the first dielectric layer. The method further includes forming a second dielectric layer on the waveguide core region and the first dielectric layer, and forming a first trench and a second trench in the second dielectric layer that are each positioned adjacent to the tapered section of the waveguide core region.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
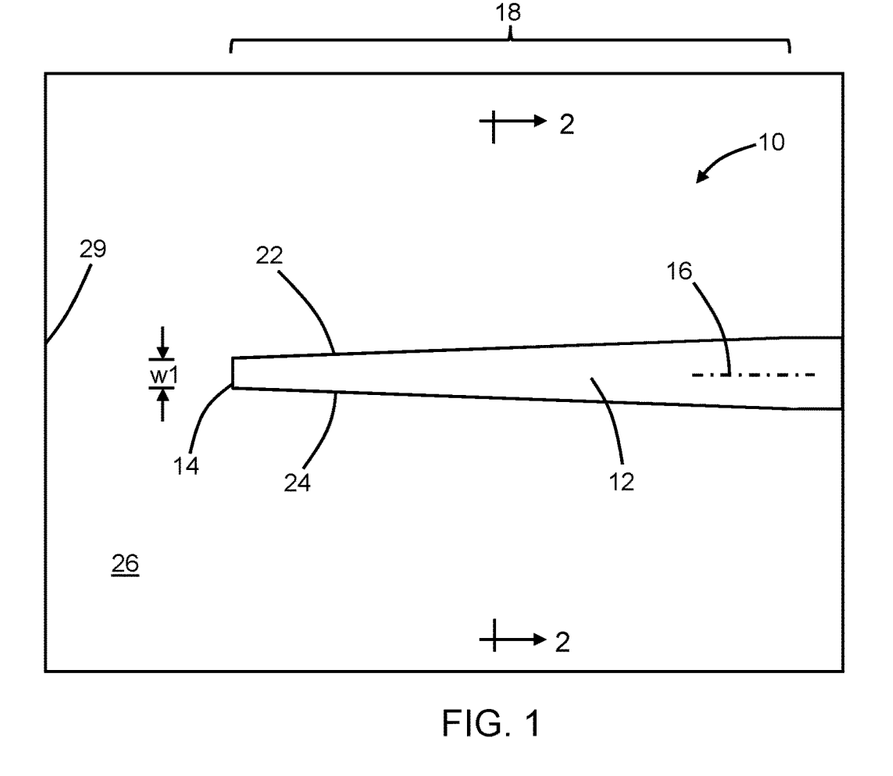
FIG. 1 is a top view of a structure at an initial fabrication stage of a processing method in accordance with embodiments of the invention.
Figure 2:
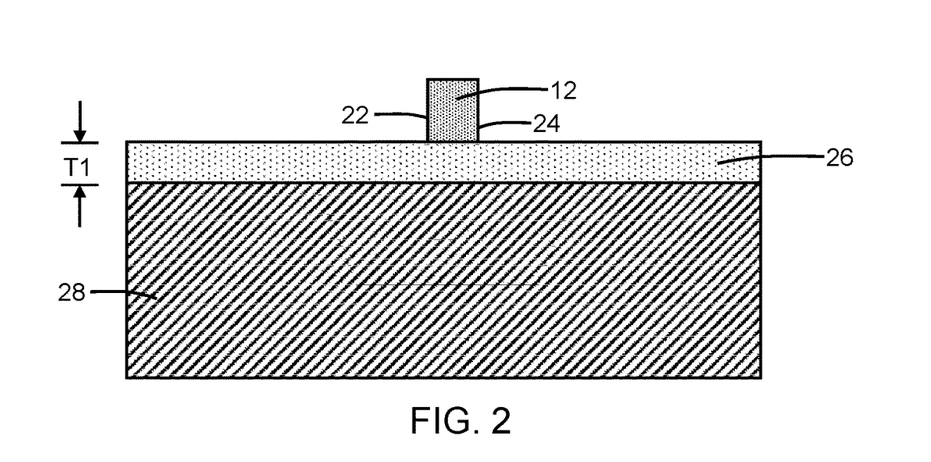
FIG. 2 is a cross-sectional view of the structure taken generally along line 2-2 in FIG. 1.

With reference to FIGS. 1, 2 and in accordance with embodiments of the invention, a structure 10 for an edge coupler includes a waveguide core region 12 having a tapered section 18 that inversely tapers relative to an end surface 14. The waveguide core region 12 may be longitudinally oriented with alignment along a longitudinal axis 16. In the representative embodiment, the end surface 14 terminates the tapered section 18 of the waveguide core region 12. The tapered section 18 may increase in width with increasing distance from the end surface 14.

Laser light may be directed from an optical fiber (not shown) toward the end surface 14 of the waveguide core region 12. The laser light may have a given wavelength, intensity, mode shape, and mode size. The gap or space between the optical fiber and the end surface 14 of the waveguide core region 12 may be filled by air or, alternatively, may be filled by an index-matching material or may include a lens. The end surface 14 of the waveguide core region 12 provides a surface of given cross-sectional area that is eventually butted with the optical fiber and that participates in receiving laser light emitted from the optical fiber.

The waveguide core region 12 may be arranged over a dielectric layer 26. In an embodiment, the dielectric layer 26 may be comprised of silicon dioxide. In an embodiment, the dielectric layer 26 may have a thickness, T1, of about 1 micron to about 5 microns, a thickness of about 2 microns to about 4 microns, or preferably a thickness of about 2.5 microns. In an embodiment, the dielectric layer 26 may be a buried oxide layer of a silicon-on-insulator wafer, and the silicon-on-insulator wafer may further include a substrate 28 comprised of a single-crystal semiconductor material, such as single-crystal silicon. The waveguide core region 12 may be comprised of a single-crystal semiconductor material, such as single-crystal silicon. In an embodiment, the waveguide core region 12 may be patterned by lithography and etching processes from a single-crystal silicon device layer of a silicon-on-insulator wafer.

The end surface 14 of the waveguide core region 12 is positioned adjacent to a side surface or edge 29 of the substrate 28. The tapered section 18 of the waveguide core region 12 includes opposite sidewalls or side surfaces 22, 24 that diverge with increasing distance from the end surface 14 along the length of the tapered section 18 to define an inverse taper. The tapered section 18 of the waveguide core region 12 may have a width dimension equal to a minimum width, W1, at the end surface 14. The tapered section 18 of the waveguide core region 12 may extend lengthwise parallel to the longitudinal axis 16 from the end surface 14 to an opposite end at a transition to a non-tapered section of the waveguide core region 12.

Figure 3:
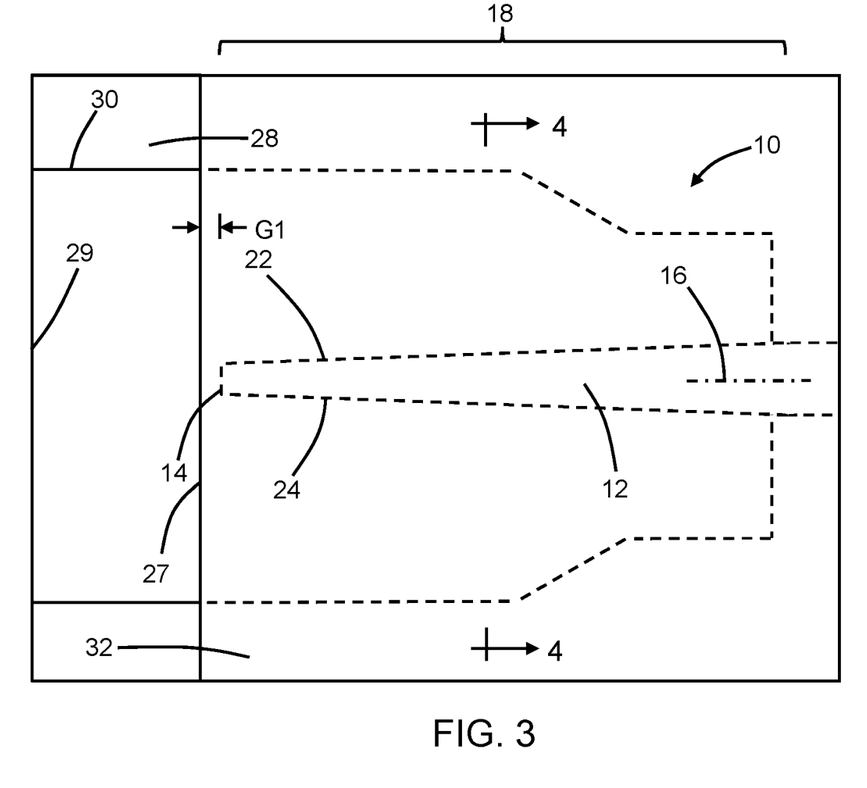
FIG. 3 is a top view of the structure at a fabrication stage of the processing method subsequent to FIG. 1.
Figure 4:
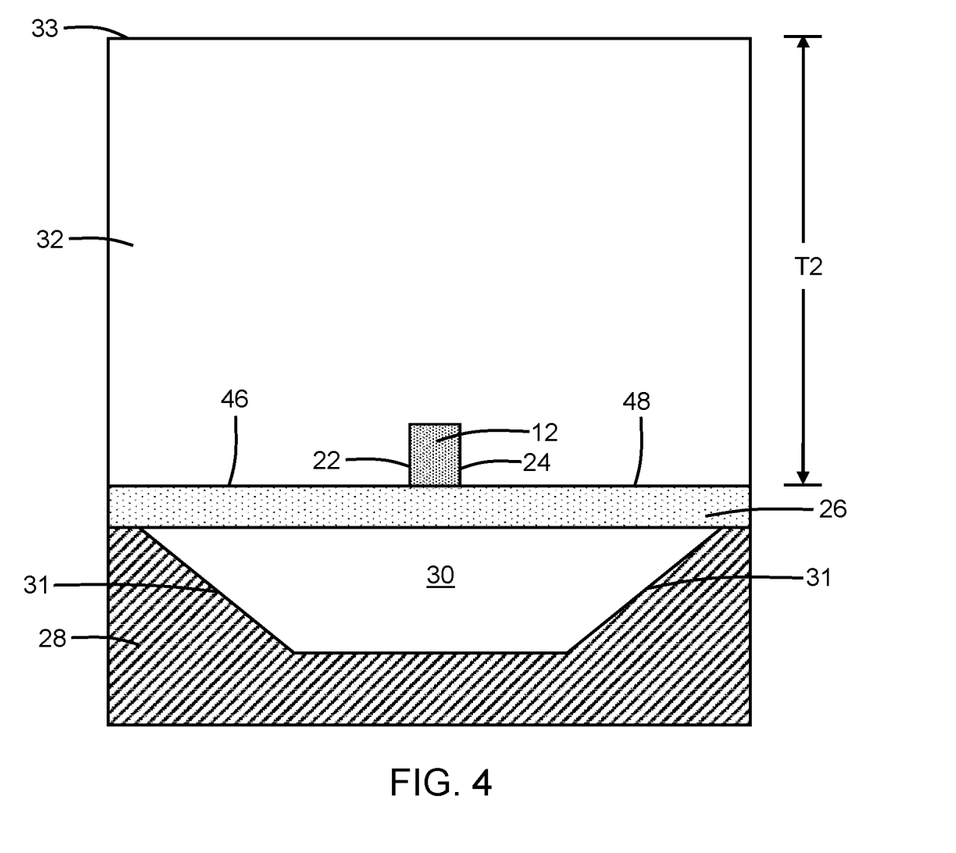
FIG. 4 is a cross-sectional view of the structure taken generally along line 4-4 in FIG. 3.

With reference to FIGS. 3, 4 in which like reference numerals refer to like features in FIGS. 1, 2 and at a subsequent fabrication stage, a back-end-of-line stack (not shown) is formed over the dielectric layer 26 and a portion of the back-end-of-line stack proximate to the waveguide core region 12 is removed and replaced by a dielectric layer 32. The dielectric layer 32 is located over the waveguide core region 12 and the dielectric layer 26. The dielectric layer 32 may be comprised of a dielectric material, such as silicon dioxide, deposited by chemical vapor deposition and planarized by, for example, chemical-mechanical polishing to remove topography. The dielectric layer 32 may have a thickness, T2, measured from the top surface 33 to the interface with the dielectric layer 26. In embodiments, the dielectric layers 26, 32 may have a total thickness in a range of about 5 microns to about 15 microns, in a range of about 7 microns to about 12 microns, or equal to about 9.5 microns. In embodiments, the dielectric layer 32 may have a refractive index in a range of about 1.3 to about 1.7, in a range of about 1.4 to about 1.5, or equal to about 1.45. In an embodiment, the refractive index of the dielectric layer 32 may be equal or substantially equal to the refractive index of the dielectric layer 26. In an alternative embodiment, the dielectric layer 32 may include multiple dielectric sublayers of substantially similar, but not identical, composition.

A groove 30 is formed in the substrate 28 that extends from the edge 29 of the substrate 28 to a side surface or edge 27 of the dielectric layer 26 and then beneath the dielectric layer 26 and tapered section 18 of the waveguide core region 12 as an undercut. The edge 27 of the dielectric layer 26 is located adjacent to the end surface 14 of the waveguide core region 12. Lithography and etching processes may be used to form a rectangular opening that extends through the dielectric layers 26, 32 and into the substrate 28 at the edge 29, and to also form holes (not shown) extending through the dielectric layers 26, 32 and into the substrate 28 adjacent to the waveguide core region 12. The formation of the rectangular opening defines the edge 27 of the dielectric layer 26. The rectangular opening in the substrate 28 is then masked with a resist, and the substrate 28 beneath the waveguide core region 12 is etched through the holes by an etching process using, for example, a sulfur hexafluoride plasma to provide an undercut. After removing the resist, a wet chemical etchant, such as a solution containing tetramethylammonium hydroxide (TMAH), may be used to provide the portion of the groove 30 between the edges 27, 29 and the portion of the groove 30 providing the undercut with a V-shape or U-shape. The wet chemical etchant may exhibit selectivity with regard to crystal orientation of the semiconductor material of the substrate 28 and be characterized by different etching rates along different crystalline directions, which produces the V-shape or U-shape.

A portion of the groove 30 in the substrate 28 is positioned adjacent to the edge 27 of the dielectric layer 26 and the end surface 14 of the waveguide core region 12. A tip of an optical fiber may be inserted and supported at least in part by the sidewalls 31 of the portion of the groove 30 that is adjacent to the end surface 14 of the waveguide core region 12. A low-index adhesive may be used to assemble the tip of the optical fiber and may fill all or part of the groove 30. In embodiments, the end surface 14 of the waveguide core region 12 may be spaced from the edge 27 of the dielectric layer 26 by a gap, G1, of less than about 40 microns, in a range about 2 microns to about 15 microns, or equal to about 1 micron. In an embodiment, the end surface 14 of the waveguide core region 12 may be coextensive with the edge 27 of the dielectric layer 26 such that the gap, G1, is absent. A portion of the groove 30 is positioned beneath the waveguide core region 12, and a portion of the dielectric layer 26 is positioned between the groove 30 and the waveguide core region 12. The portion of the dielectric layer 26 located over the groove 30 defines a membrane that is undercut due to the presence of the groove 30.

Figure 5:
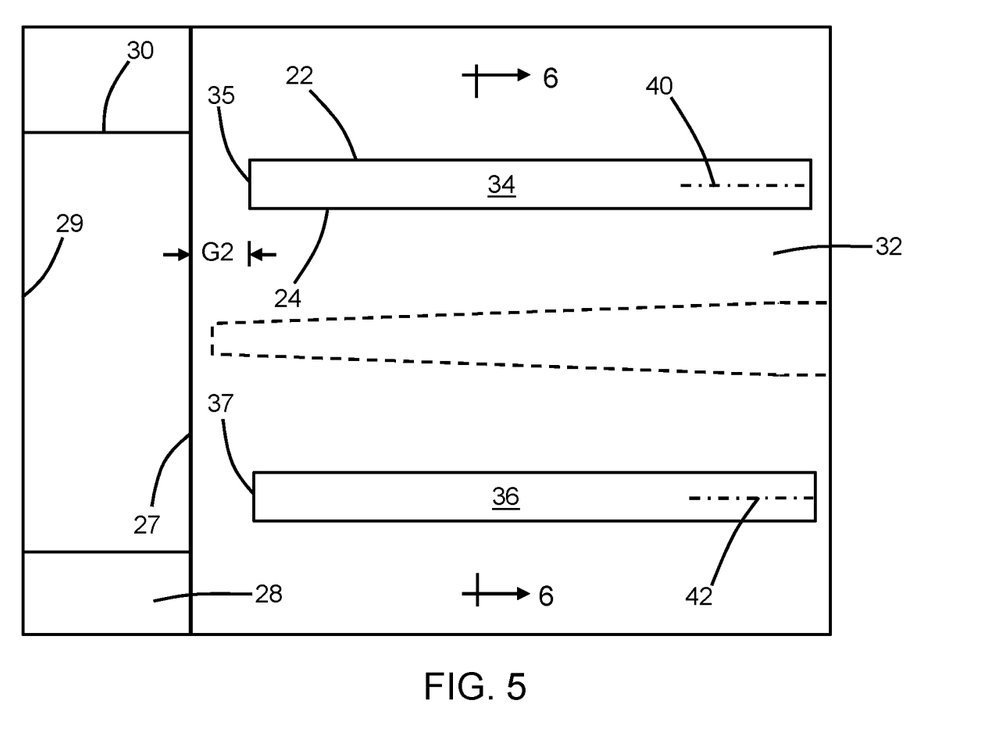
FIG. 5 is a top view of the structure at a fabrication stage of the processing method subsequent to FIG. 3.
Figure 6:
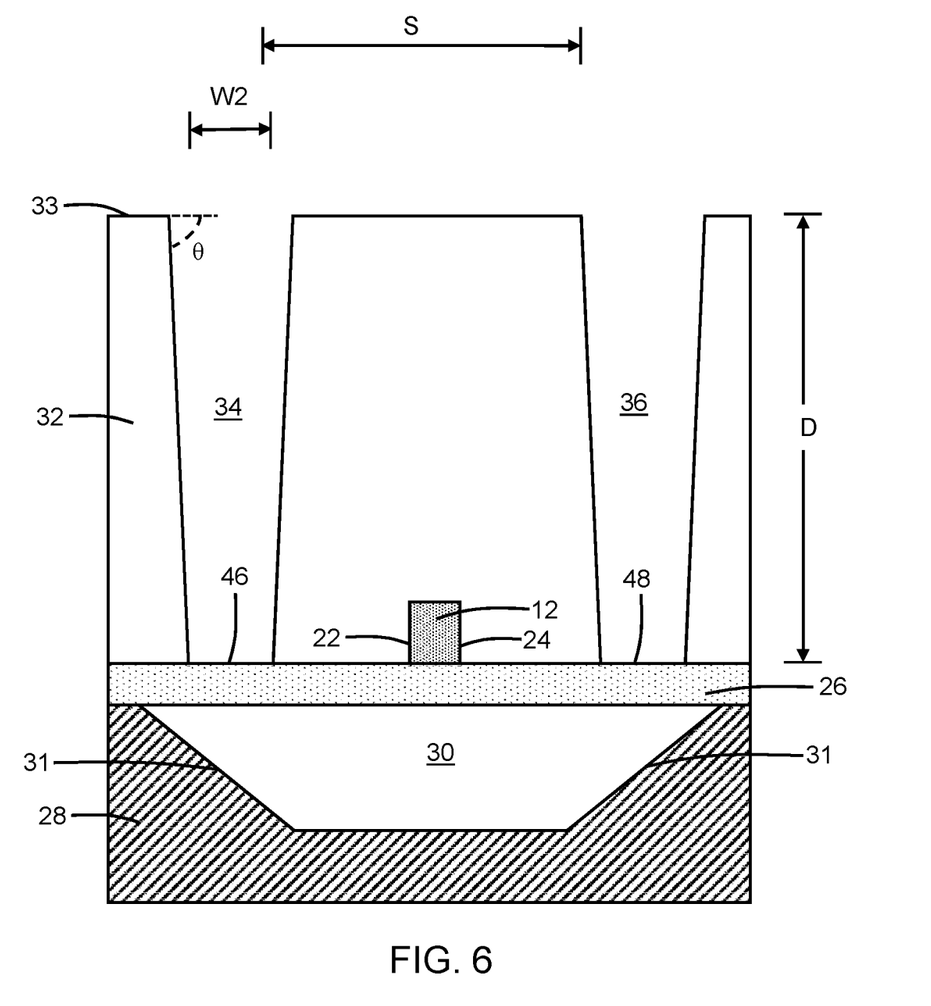
FIG. 6 is a cross-sectional view of the structure taken generally along line 6-6 in FIG. 5.

With reference to FIGS. 5, 6 in which like reference numerals refer to like features in FIGS. 3, 4 and at a subsequent fabrication stage, the dielectric layer 32 is patterned by lithography and etching processes to form trenches 34, 36 that define elongate grooves in the dielectric layer 32. The trenches 34, 36 may extend to a depth, D, relative to a top surface 33 of the dielectric layer 32 and have respective trench bottoms 46, 48 located at the depth, D. In an embodiment, the depth, D, of the trenches 34, 36 may be equal to or substantially equal to the thickness of the dielectric layer 32. In an alternative embodiment, the trenches 34, 36 may extend partially through the dielectric layer 32 such that the depth, D, of the trenches 34, 36 is less than the thickness of the dielectric layer 32. In an alternative embodiment, the trenches 34, 36 may penetrate fully through the dielectric layer 32 and into the dielectric layer 26 such that the depth, D, of the trenches 34, 36 is greater than the thickness of the dielectric layer 32. The trench 34 has sidewalls 50, 51 that intersect the trench bottom 46, and the trench 36 has sidewalls 52, 53 that intersect the trench bottom 48. The trenches 34, 36 are also characterized by a width, W2, at their respective trench bottoms 46, 48, a sidewall inclination angle, θ, and a sidewall-to-sidewall spacing, S, at one-half of the depth, D.

The tapered section 18 of the waveguide core region 12 is positioned laterally between the trench 34 and the trench 36. In an embodiment, the tapered section 18 of the waveguide core region 12 may be centered or substantially centered between the trench 34 and the trench 36. The trench 34 may extend longitudinally with alignment along a longitudinal axis 40, and the trench 36 may extend longitudinally with alignment along a longitudinal axis 42. In an embodiment, the longitudinal axis 40 may be oriented parallel or substantially parallel to the longitudinal axis 42. In an embodiment, the longitudinal axes 40, 42 may be oriented parallel or substantially parallel to the longitudinal axis 16 of the waveguide core region 12.

The trenches 34, 36 may have respective end surfaces 35, 37 adjacent to the edge 27 of the dielectric layer 26. In an embodiment, the end surface 35 of the trench 34 and the end surface 37 of the trench 36 may be spaced from the edge 27 of the dielectric layer 26 by a gap, G2. In embodiments, the gap, G2, may be less than about 50 microns, in a range of about 2 microns to about 20 microns, or equal to about 5 micron. In an embodiment, the end surfaces 35, 37 may extend to the edge 27 of the dielectric layer 26 such that the gap, G2, is absent.

In embodiments, the width, W2, of the trenches 34, 36 may be in a range from about 1 micron to about 50 microns, a range from about 3 microns to about 15 microns, or equal to about 5 microns. In embodiments, the spacing, S, between the trenches 34, 36 may be in a range from about 5 microns to about 15 microns, a range from about 8 micron to about 13 microns, or equal to about 11 microns. In embodiments, the sidewall inclination angle, θ, may be in a range from about 45 degrees to about 110 degrees, a range from about 70 degrees to about 95 degrees, or equal to about 85 degrees. In an embodiment, the trenches 34, 36 may have a refractive index that is less than the refractive index of the dielectric layers 26, 32. In an embodiment, the trenches 34, 36 may be filled by air.

The structure 10, in any of its embodiments described herein, may be integrated into a photonics chip that includes electronic components and additional optical components. For example, the electronic components may include field-effect transistors that are fabricated by CMOS processing.

The structure 10 defines a grooved suspended membrane that is arranged over the groove 30. The trenches 34, 36 may provide secondary confinement that promotes efficient butt-end optical coupling of the tapered section 18 of the waveguide core region 12 with an optical fiber having a tip positioned in the groove 30. In that regard, the trenches 34, 36 may improve mode matching (i.e., the matching of mode shape and/or mode size) with the laser light output by the optical fiber to enhance the efficiency of the optical coupling. The trenches 34, 36 may set the mode shape, and the waveguide core region 12 may make the mode fundamentally guided and restrict its substantial leakage through the side surfaces 22, 24. The trenches 34, 36 may limit the variability in mode shape and mode size associated with fabrication tolerances on the height and width of the waveguide core region 12 and fabrication tolerances on the refractive indices of the dielectric layers 26, 32 and waveguide core region 12.

Figure 7:
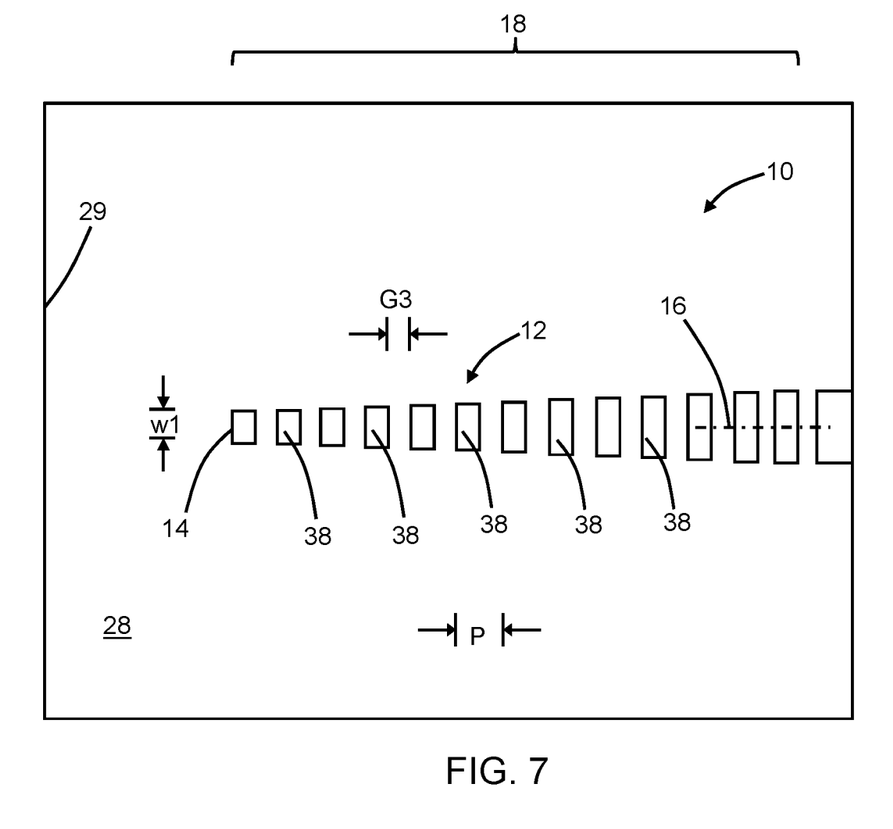
FIG. 7 is a top view of a structure in accordance with alternative embodiments of the invention.

With reference to FIG. 7 in which like reference numerals refer to like features in FIG. 1 and in accordance with alternative embodiments of the invention, the tapered section 18 of the waveguide core region 12 may be divided into multiple sections or segments 38 that are laterally spaced along the longitudinal axis 16 with a given pitch and duty cycle, and that are separated by gaps, G3, of a given dimension. The segments 38 may be defined during the lithography and etching processes forming the waveguide core region 12, and the duty cycle may be equal to a ratio of the dimension of the gaps, G3, to the pitch of the segments 38. The segments 38 have individual width dimensions in a direction transverse to the longitudinal axis 16 that provide the tapering of the tapered section 18 of the waveguide core region 12. The segments 38 are positioned at small enough pitch so as not to radiate or reflect light at the wavelength of operation and act as an effective optical material, and therefore define a metamaterial waveguide. In an embodiment, the width dimensions of the segments 38 in the waveguide core region 12 may increase with increasing distance from the end surface 14. In an embodiment, the pitch of the segments 38 in the waveguide core region 12 may decrease with increasing distance from the end surface 14. In an embodiment, the duty cycle and pitch of the segments 38 in the waveguide core region 12 may increase with increasing distance from the end surface 14. The arrangement of segments 38 of the waveguide core region 12 may be characterized by optical properties (e.g., refractive index) that differ from bulk optical properties of the segments 38 and the portions of the dielectric layer 26 in the gaps. In an embodiment, the pitch of the segments 38 may be substantially less than half the wavelength of the laser light being received by the structure 10 from the optical fiber.

In embodiments, the segments 38 of the segmented waveguide core region 12 may have a refractive index in a range of about 1.7 to about 2.7, a thickness in a range of about 0.15 microns to about 0.4 microns, a width at the end surface 14 in a range of about 0.1 microns to about 0.25 microns, and a duty cycle of about 0.15 to about 0.35. In embodiments, the segments 38 of the segmented waveguide core region 12 may have a refractive index in a range of about 2.7 to about 4.5, a thickness in a range of about 0.14 microns to about 0.25 microns, a width at the end surface 14 in a range of about 0.05 microns to about 0.12 microns, and a duty cycle of about 0.15 to about 0.35. In an embodiment, the segments 38 of the segmented waveguide core region 12 may have a refractive index equal to about 3.5, a thickness equal to about 0.15 microns, a width at the end surface 14 equal to about 0.09 microns, and a duty cycle of about 0.25. In embodiments, the pitch of the segments 38 may be in a range of about 0.1 microns to about 0.4 microns, or in a range of about 0.15 microns to about 0.3 microns.

Figure 8:
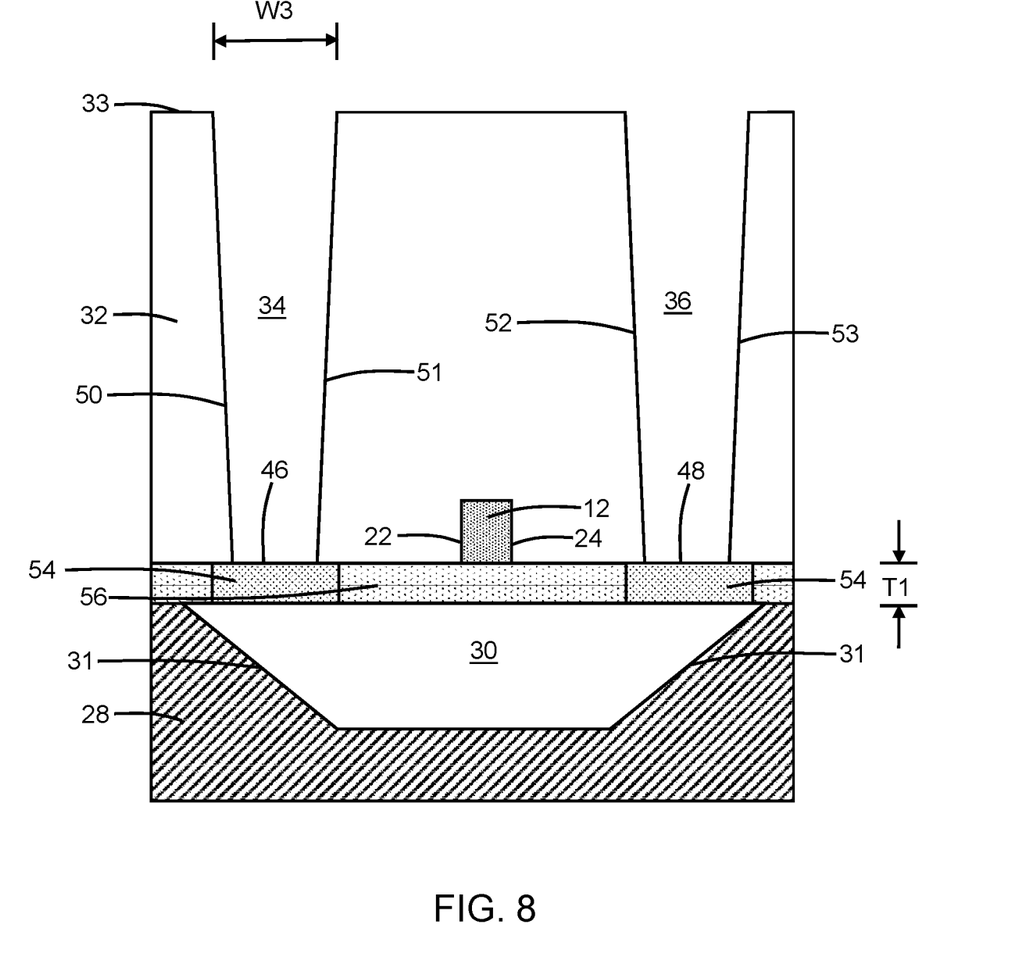
FIG. 8 is a cross-sectional view of a structure in accordance with alternative embodiments of the invention.

With reference to FIG. 8 in which like reference numerals refer to like features in FIG. 6 and in accordance with alternative embodiments of the invention, the dielectric layer 26 may be altered to include sections 54 adjacent to, and below, the trench bottoms 46, 48 of the trenches 34, 36 and sections 56 arranged adjacent to the sections 54. The sections 54 of the dielectric layer 26 may have a width, W3, that is greater than the width of the trenches 34, 36 at the respective trench bottoms 46, 48 and, for that reason, the dielectric layer 32 may overlap with the sections 54 of the dielectric layer 26 adjacent to the respective trench bottoms 46, 48 of the trenches 34, 36. The extent of the overlap may be less than the thickness, T1, of the dielectric layer 26.

In an embodiment, the sections 54 of the dielectric layer 26 may have a different composition than the sections 56. In an embodiment, the sections 54 may contain silicon dioxide deposited by plasma-enhanced chemical vapor deposition, and the sections 56 may contain silicon dioxide formed by a thermal oxidation process. In an embodiment, the sections 54 of the dielectric layer 26 may be comprised of a dielectric material having a refractive index that is different than the refractive index of the dielectric material of the adjacent sections 56 of the dielectric layer 26. In an embodiment, the refractive index of the dielectric material of the sections 54 may be slightly greater than the refractive index of the dielectric material of the sections 56. In an embodiment, the refractive index of the dielectric material of the sections 54 may be substantially equal to the refractive index of the dielectric material of the dielectric layer 32. In an embodiment, the respective refractive indices of the dielectric layer 32 and the sections 54 of the dielectric layer 26 may be greater than the refractive index of the sections 56 of the dielectric layer 26 by 0.001 dimensionless units to 0.015 dimensionless units.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an edge coupler, the structure comprising:
    a first dielectric layer including an edge;
    a waveguide core region on the first dielectric layer, the waveguide core region having a tapered section with an end surface that terminates adjacent to the edge of the first dielectric layer; and
    a second dielectric layer on the waveguide core region and the first dielectric layer, the second dielectric layer including a first trench and a second trench each positioned adjacent to the tapered section of the waveguide core region,
    wherein the tapered section of the waveguide core region is laterally positioned between the first trench and the second trench, the first dielectric layer is positioned on a substrate, the substrate includes a groove that is positioned beneath the waveguide core region, and the first dielectric layer includes a portion that is positioned between the groove and the waveguide core region.

2. The structure of claim 1 wherein the tapered section of the waveguide core region is laterally centered between the first trench and the second trench.

3. The structure of claim 1 wherein the first trench and second trench are spaced from the edge of the first dielectric layer by a gap.

4. The structure of claim 1 wherein the first trench and the second trench extend to intersect the edge of the first dielectric layer.

5. The structure of claim 1 wherein the first trench and the second trench extend fully through the second dielectric layer.

6. The structure of claim 3 wherein the first trench and the second trench extend partially through the second dielectric layer.

7. A structure for an edge coupler, the structure comprising:
    a first dielectric layer including an edge;
    a waveguide core region on the first dielectric layer, the waveguide core region having a tapered section with an end surface that terminates adjacent to the edge of the first dielectric layer; and
    a second dielectric layer on the waveguide core region and the first dielectric layer, the second dielectric layer including a first trench and a second trench each positioned adjacent to the tapered section of the waveguide core region,
    wherein the first trench has a first trench bottom, the second trench has a second trench bottom, the first dielectric layer includes a first section positioned beneath the first trench bottom, a second section positioned beneath the second trench bottom, and a third section positioned laterally between the first section and the second section, and the first section and the second section of the first dielectric layer comprise a dielectric material having a different refractive index than the third section of the first dielectric layer.

8. The structure of claim 7 wherein the first section of the first dielectric layer is wider than the first trench bottom, and the second section of the first dielectric layer is wider than the second trench bottom.

9. The structure of claim 7 wherein the first dielectric layer is positioned on a substrate, the substrate includes a groove that is positioned beneath the tapered section of the waveguide core region, and the third section of the first dielectric layer is positioned between the groove and the waveguide core region.

10. The structure of claim 1 wherein the first trench is aligned along a first longitudinal axis, and the second trench is aligned along a second longitudinal axis that is oriented substantially parallel to the first longitudinal axis.

11. The structure of claim 10 wherein the waveguide core region is aligned along a third longitudinal axis, and the third longitudinal axis is oriented substantially parallel to the first longitudinal axis and substantially parallel to the second longitudinal axis.

12. The structure of claim 1 wherein the groove includes a second portion positioned adjacent to the edge of the first dielectric layer and the end surface of the tapered section.

13. A method of forming a structure for an edge coupler, the method comprising:
    forming a waveguide core region on a first dielectric layer, wherein the waveguide core region has a tapered section with an end surface that terminates adjacent to an edge of the first dielectric layer;
    forming a second dielectric layer on the waveguide core region and the first dielectric layer; and
    forming a first trench and a second trench in the second dielectric layer that are each positioned adjacent to the tapered section of the waveguide core region,
    wherein the first dielectric layer is positioned on a substrate, the substrate includes a groove that is positioned beneath the waveguide core region, and the first dielectric layer includes a portion that is positioned between the groove and the waveguide core region.

14. The method of claim 13 wherein the first trench is aligned along a first longitudinal axis, the second trench is aligned along a second longitudinal axis that is oriented substantially parallel to the first longitudinal axis, and the waveguide core region is aligned along a third longitudinal axis that is oriented substantially parallel to the first longitudinal axis and substantially parallel to the second longitudinal axis.

15. The method of claim 13 wherein the first trench and the second trench are spaced from the edge of the first dielectric layer by a gap.

16. The structure of claim 7 wherein the tapered section of the waveguide core region is laterally positioned between the first trench and the second trench.

17. The structure of claim 7 wherein the first dielectric layer is positioned on a substrate, the substrate includes a groove having a first portion positioned beneath the tapered section of the waveguide core region, and the first section, the second section, and the third section of the first dielectric layer are positioned between the first portion of the groove and the waveguide core region.

18. The structure of claim 17 wherein the groove includes a second portion positioned adjacent to the edge of the first dielectric layer and the end surface of the tapered section.

19. The structure of claim 7 wherein the first trench is aligned along a first longitudinal axis, the second trench is aligned along a second longitudinal axis that is oriented substantially parallel to the first longitudinal axis, the waveguide core region is aligned along a third longitudinal axis, and the third longitudinal axis is oriented substantially parallel to the first longitudinal axis and substantially parallel to the second longitudinal axis.

* * * * *